(12) United States Patent  (10) Patent No.: US 10,514,583 B2
Zhang                            (45) Date of Patent:      Dec. 24, 2019

(54) COLOR ELECTROPHORETIC DISPLAY

(71) Applicant: E Ink California, LLC, Fremont, CA (US)

(72) Inventor: Xiaojia Zhang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 312 days.

(21) Appl. No.: 14/868,073

(22) Filed: Sep. 28, 2015

(65) Prior Publication Data

US 2016/0026062 A1    Jan. 28, 2016

Related U.S. Application Data

(63) Continuation-in-part of application No. 13/360,378, filed on Jan. 27, 2012, now Pat. No. 9,146,439.

(60) Provisional application No. 61/438,171, filed on Jan. 31, 2011.

(51) Int. Cl.
    *G02F 1/167*   (2019.01)
    *G02F 1/1675*  (2019.01)

(52) U.S. Cl.
    CPC ............ *G02F 1/167* (2013.01); *G02F 1/1675* (2019.01); *G02F 2001/1678* (2013.01)

(58) Field of Classification Search
    CPC ..................... G02F 1/167; G02F 2001/1678
    USPC ................................................. 359/290–297
    See application file for complete search history.

(56) References Cited

U.S. PATENT DOCUMENTS

| 3,892,568 | A  | 7/1975  | Ota |
| 4,298,448 | A  | 11/1981 | Muller |
| 5,378,574 | A  | 1/1995  | Winnik |
| 5,980,719 | A  | 11/1999 | Cherukuri |
| 6,198,809 | B1 | 3/2001  | DiSanto |
| 6,323,989 | B1 | 11/2001 | Jacobson et al. |
| 6,337,761 | B1 | 1/2002  | Rogers |
| 6,373,461 | B1 | 4/2002  | Hasegawa |
| 6,486,866 | B1 | 11/2002 | Kuwahara |
| 6,517,618 | B2 | 2/2003  | Foucher |
| 6,538,801 | B2 | 3/2003  | Jacobson et al. |
| 6,680,726 | B2 | 1/2004  | Gordon, II |
| 6,693,620 | B1 | 2/2004  | Herb |

(Continued)

FOREIGN PATENT DOCUMENTS

| CN | 101542383    |    | 9/2009 |
| WO | 1999053373   | A1 | 10/1999 |
| WO | WO 01/067170 |    | 9/2001 |

OTHER PUBLICATIONS

Sprague, R.A. (Sep. 23, 2009) SiPix Microcup Electrophoretic Epaper for Ebooks. *NIP* 25, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA.).

(Continued)

*Primary Examiner* — Joseph P Martinez
*Assistant Examiner* — Vipin Patel
(74) *Attorney, Agent, or Firm* — Brian D. Bean

(57) ABSTRACT

This invention relates to an electrophoretic display fluid comprising non-charged or slightly charged color particles and at least one type of charged pigment particles, all dispersed in a solvent or solvent mixture, and an electrophoretic display device utilizing such a display fluid. The electrophoretic fluid of the present invention provides improved image qualities.

7 Claims, 7 Drawing Sheets

(56) References Cited

U.S. PATENT DOCUMENTS

| | | |
|---|---|---|
| 6,704,133 B2 | 3/2004 | Gates et al. |
| 6,724,521 B2 | 4/2004 | Nakao |
| 6,729,718 B2 | 5/2004 | Goto |
| 6,806,995 B2 | 10/2004 | Chung |
| 6,864,875 B2 | 3/2005 | Drzaic |
| 6,885,495 B2 | 4/2005 | Liang et al. |
| 6,930,818 B1 | 8/2005 | Liang et al. |
| 6,987,503 B2 | 1/2006 | Inoue |
| 7,009,756 B2 | 3/2006 | Kishi |
| 7,019,889 B2 | 3/2006 | Katase |
| 7,038,655 B2 | 5/2006 | Herb |
| 7,038,670 B2 | 5/2006 | Liang |
| 7,046,228 B2 | 5/2006 | Liang |
| 7,050,218 B2 | 5/2006 | Kanbe |
| 7,057,600 B2 | 6/2006 | Goden |
| 7,075,502 B1 | 7/2006 | Drzaic |
| 7,259,744 B2 | 8/2007 | Arango |
| 7,283,199 B2 | 10/2007 | Aichi et al. |
| 7,352,353 B2 | 4/2008 | Albert |
| 7,365,732 B2 | 4/2008 | Matsuda |
| 7,414,777 B2 | 8/2008 | Machida et al. |
| 7,417,787 B2 | 8/2008 | Chopra |
| 7,420,549 B2 | 9/2008 | Jacobson |
| 7,474,295 B2 | 1/2009 | Matsuda |
| 7,545,557 B2 | 6/2009 | Iftime |
| 7,548,291 B2 | 6/2009 | Lee |
| 7,652,656 B2 | 1/2010 | Chopra et al. |
| 7,848,009 B2 | 12/2010 | Machida et al. |
| 7,911,681 B2 | 3/2011 | Ikegami |
| 7,933,062 B2 | 4/2011 | Masuzawa et al. |
| 7,982,941 B2 | 7/2011 | Lin |
| 8,072,675 B2 | 12/2011 | Lin |
| 8,115,729 B2 | 2/2012 | Danner et al. |
| 8,169,690 B2 | 5/2012 | Lin |
| 8,422,116 B2 | 4/2013 | Sprague |
| 8,466,852 B2 | 6/2013 | Drzaic |
| 8,649,084 B2 | 2/2014 | Wang |
| 8,670,174 B2 | 3/2014 | Sprague |
| 8,704,756 B2 | 4/2014 | Lin |
| 8,797,258 B2 | 8/2014 | Sprague |
| 9,146,439 B2 | 9/2015 | Zhang |
| 2002/0131147 A1* | 9/2002 | Paolini, Jr. ............... G02F 1/167 359/296 |
| 2003/0070929 A1* | 4/2003 | Shannon ................ G02F 1/167 204/606 |
| 2004/0032390 A1* | 2/2004 | Liang ..................... G02F 1/167 345/107 |
| 2004/0263946 A9* | 12/2004 | Liang ..................... G02F 1/167 359/296 |
| 2007/0188848 A1* | 8/2007 | Machida ................ G02F 1/167 359/296 |
| 2009/0268274 A1* | 10/2009 | Masuzawa ............. G02F 1/167 359/296 |
| 2011/0217639 A1 | 9/2011 | Sprague |

OTHER PUBLICATIONS

Zang, H.M., Wang, F., Kang, Y.M., Chen, Y. And Lin, W. (Jul. 2007) *Microcup® e-Paper for Embedded and Flexible Designs.* IDMC'07, Taipei International Convention Center, Taiwan.

Zang, H.M. (Feb. 2007) *Developments in Microcup® Flexible Displays.* Presentation conducted at the 6th Annual Flexible Display and Microelectronics Conference, Phoenix, AZ Feb. 6-8.

Ho, Andrew. (Nov. 2006) *Embedding e-Paper in Smart Cards, Pricing Labels & Indicators.* Presentation conducted at Smart Paper Conference Nov. 15-16, 2006, Atlanta, GA, USA.

Zang, H.M. (Sep. 2006) *Monochrome and Area Color Microcup® EPDs by Roll-to-Roll Manufacturing Process.* Presentation conducted at the Fourth Organic Electronics Conference and Exhibition (OEC-06), Sep. 25-27, 2006, Frankfurt, Germany.

Wang, X., Zang, H.M. and Li, P. (Jun. 2006) Roll-to-Roll Manufacturing Process for Full Color Electrophoretic film. *SID Digest,* 00pp. 1587-1589.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings,* pp. 362-365.

Wang, X., Li, P., Sodhi, D., Xu, T. and Bruner, S. et al., (Feb. 2006) *Inkjet Fabrication of Multi-Color Microcup® Electrophorectic Display.* The Flexible Microelectronics & Displays Conference of U.S. Display Consortium.

Liang, R.C., (Feb. 2005) *Flexible and Roll-able Displays/Electronic Paper—A Brief Technology Overview.* Flexible Display Forum, 2005, Taiwan.

Zang, H.M. & Hou, Jack, (Feb. 2005) *Flexible Microcup® EPD by RTR Process.* Presentation conducted at $2^{nd}$ Annual Paper-Like Displays Conference, Feb. 9-11, 2005, St. Pete Beach, Florida.

Ho, Candice. (Feb. 1, 2005) *Microcupt® Electronic Paper Device and Application.* Presentation conducted at USDC 4th Annual Flexible Display Conference 2005.

Bardsley, J.N. & Pinnel, M.R. (Nov. 2004) Microcup™ Electrophoretic Displays. *USDC Flexible Display Report,* 3.1.2. pp. 3-12-3-16.

Liang, R.C. (Oct. 2004) *Flexible and Roll-able Displays/Electronic Paper—A Technology Overview.* Paper presented at the METS 2004 Conference in Taipie, Taiwan.

Liang, R.C., Zang, H.M., Wang, X., Chung, J. & Lee, H., (Jun./Jul. 2004) « Format Flexible Microcup® Electronic Paper by Roll-to-Roll Manufacturing Process », Presentation conducted at the 14th FPD Manufacturing Technology EXPO & Conference.

Wang, X., Kiluk, S., Chang, C., & Liang, R.C., (Jun. 2004) Microcup® Electronic Paper and the Converting Processes. *Advanced Display,* Issue 43, 48-51 (in Chinese, with English abstract).

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest,* 32.3, 1066-1069.

Liang, R.C. (Apr. 2004). *Microcup Electronic Paper by Roll-to-Roll Manufacturing Process.* Presentation at the Flexible Displays & Electronics 2004 of Intertech, San Fransisco, California, USA.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.,* vol. 814, I9.6.1.

Wang, X., Kiluk, S., Chang, C., & Liang, R.C. (Feb. 2004). Mirocup® Electronic Paper and the Converting Processes. *ASID,* 10.1.2-26, 396-399, Nanjing, China.

Zang, H.M. (Feb. 2004). *Microcup Electronic Paper.* Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of Spie-IS&T Electronic Imaging, SPIE* vol. 5289, 102-108.

Ho, C., & Liang, R.C. (Dec. 2003). *Microcup® Electronic Paper by Roll-to-Roll Manufacturing Processes.* Presentation conducted at FEG, Nei-Li, Taiwan.

Chung, J., Hou, J., Wang, W., Chu, L.Y., Yao, W., & Liang, R.C. (Dec. 2003). Microcup® Electrophoretic Displays, Grayscale and Color Rendition. *IDW,* AMD2/EP1-2, 243-246.

Zang, H.M. (Oct. 2003). *Microcup® Electronic Paper by Roll-to-Roll Manufacturing Processes.* Presentation conducted at the Advisory Board Meeting, Bowling Green State University, Ohio, USA.

Allen, K. (Oct. 2003). Electrophoretics Fulfilled. *Emerging Displays Review: Emerging Display Technologies, Monthly Report—Oct. 9-14, 2003.*

Kleper, M., Miller, P., Miller L. (Oct. 2003) An Investigation of the Emerging and Developing Technologies Related to the Generation Beyond Print-on-Paper. *Advanced Display Technologies,* Oct. 2003, pp. 13-15, Rochester Institute of Technology (R.I.T.).

Zang, H.M., & Liang, R.C. (2003) Microcup Electronic Paper by Roll-to-Roll Manufacturing Processes. *The Spectrum,* 16(2), 16-21.

Chen, S.M. (Jul. 2003) The Applications for the Revolutionary Electronic Paper Technology. *OPTO News & Letters,* 102, 37-41. (in Chinese, English abstract attached).

(56) References Cited

OTHER PUBLICATIONS

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Chen, S.M. (May 2003) The New Application and the Dynamics of Companies. *TRI*. 1-10. (In Chinese, English abstract attached).

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona.

Liang, R.C., Hou, J., & Zang, H.M. (Dec. 2002) Microcup Electrophoretic Displays by Roll-to-Roll Manufacturing Processes. *IDW*, EP2-2, 1337-1340.

Nikkei Microdevices. (Dec. 2002) Newly-Developed Color Electronic Paper Promises—Unbeatable Production Efficiency. *Nikkei Microdevices*, p. 3. (in Japanese, with English translation).

\* cited by examiner

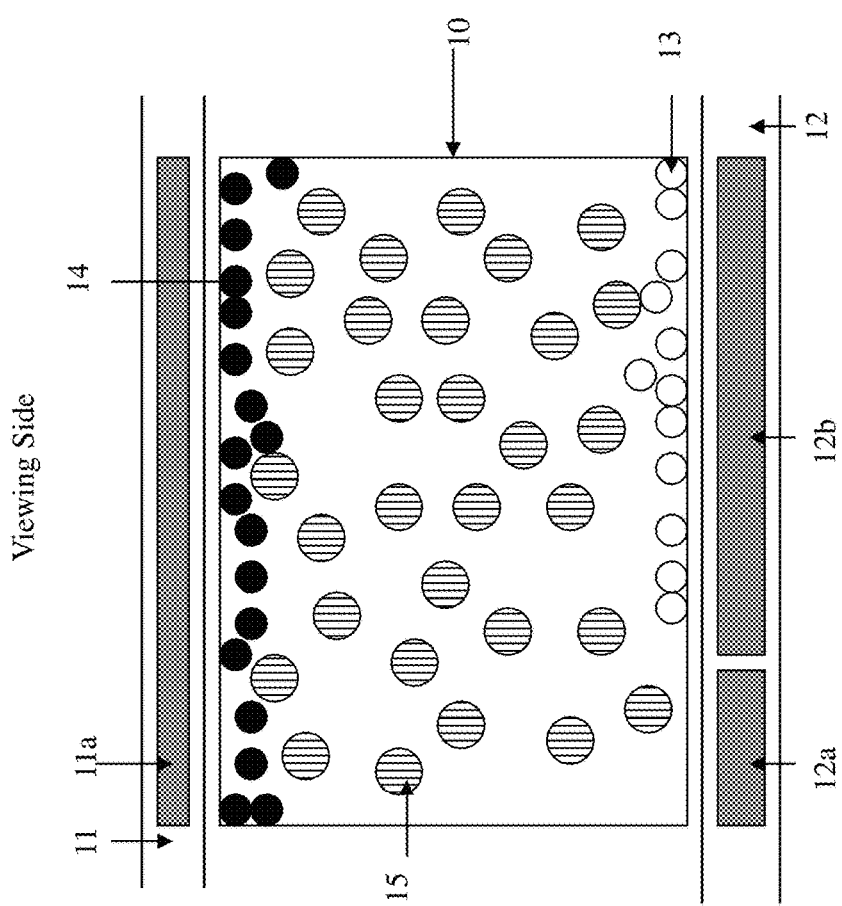

COLOR ELECTROPHORETIC DISPLAY

This is a continuation-in-part application of U.S. application Ser. No. 13/360,378, filed Jan. 27, 2012, which claims priority to U.S. Provisional Application No. 61/438,171, filed Jan. 31, 2011; the contents of all of which are incorporated herein by reference in their entirety.

FIELD OF THE INVENTION

This invention relates to a color electrophoretic display utilizing non-charged or slightly charged color particles.

DESCRIPTION OF RELATED ART

In order to achieve a multicolor display, color filters are often used. The most common approach is to add color filters on top of black/white sub-pixels of a pixellated display to display the red, green and blue colors. When a red color is desired, the green and blue sub-pixels are turned to the black state so that the color displayed is red. When a green color is desired, the red and blue sub-pixels are turned to the black state so that the color displayed is green. When a blue color is desired, the green and red sub-pixels are turned to the black state so that the color displayed is blue. When the black state is desired, all three sub-pixels are turned to the black state. When the white state is desired, the three sub-pixels are turned to red, green and blue, respectively, and as a result, a white state is seen by the viewer.

A major disadvantage of such a technique is that since each of the sub-pixels has a reflectance of about one third of the desired white state, the white state is fairly dim. To compensate this, a fourth sub-pixel may be added which can display only the black and white states, so that the white level may be doubled, but at the expense of the red, green or blue color level (where each sub-pixel is only one fourth of the area of a pixel). However, even with this approach, the white level is still substantially less than half of that of a black and white display, rendering it an unacceptable choice for display devices, such as e-readers or displays that need well readable black-white brightness and contrast.

SUMMARY OF THE INVENTION

The first aspect of the present invention is directed to an electrophoretic display fluid, which comprises non-charged or slightly charged color particles and at least one type of charged pigment particles dispersed in a solvent or solvent mixture.

In one embodiment, the fluid further comprises a second type of charged pigment particles and the two types of charged pigment particles are oppositely charged.

In one embodiment, the fluid comprises charged white pigment particles and charged black pigment particles.

In one embodiment, the slightly charged color particles carry the same charge polarity as the black charged pigment particles.

In another embodiment, the slightly charged color particles carry the same charge polarity as the white charged pigment particles.

In one embodiment, the non-charged or slightly charged color particles are red, green or blue.

In one embodiment, the slightly charged color particles have a zeta potential of less than 20.

In one embodiment, the solvent or solvent mixture is clear and colorless.

In one embodiment, the solvent is a hydrocarbon solvent.

In one embodiment, the fluid further comprises a charge control agent.

In one embodiment, the fluid comprises only one type of charged pigment particles.

In one embodiment, the charged pigment particles are white and the non-charged or slightly charged color particles are red, green, blue or black.

The second aspect of the present invention is directed to an electrophoretic display comprising display cells wherein each of the display cells is filled with an electrophoretic display fluid comprising non-charged or slightly charged color particles and at least one type of charged pigment particles dispersed in a solvent or solvent mixture.

In one embodiment, three display cells form a pixel and a first display cell is filled with a display fluid comprising non-charged or slightly charged red particles, a second display cell is filled with a display fluid comprising non-charged or slightly charged green particles and a third display cell is filled with a display fluid comprising non-charged or slightly charged blue particles.

In one embodiment, each of the display cells is a sub-pixel.

In one embodiment, the non-charged or slightly charged particles are of the same color in all display cells.

The electrophoretic fluid of the present invention provides improved image qualities.

BRIEF DESCRIPTION OF THE DRAWINGS

FIGS. 1a-1c illustrate how an electrophoretic display utilizing non-charged or slightly charged color particles displays different color states.

DETAILED DESCRIPTION OF THE INVENTION

Figure 1B:
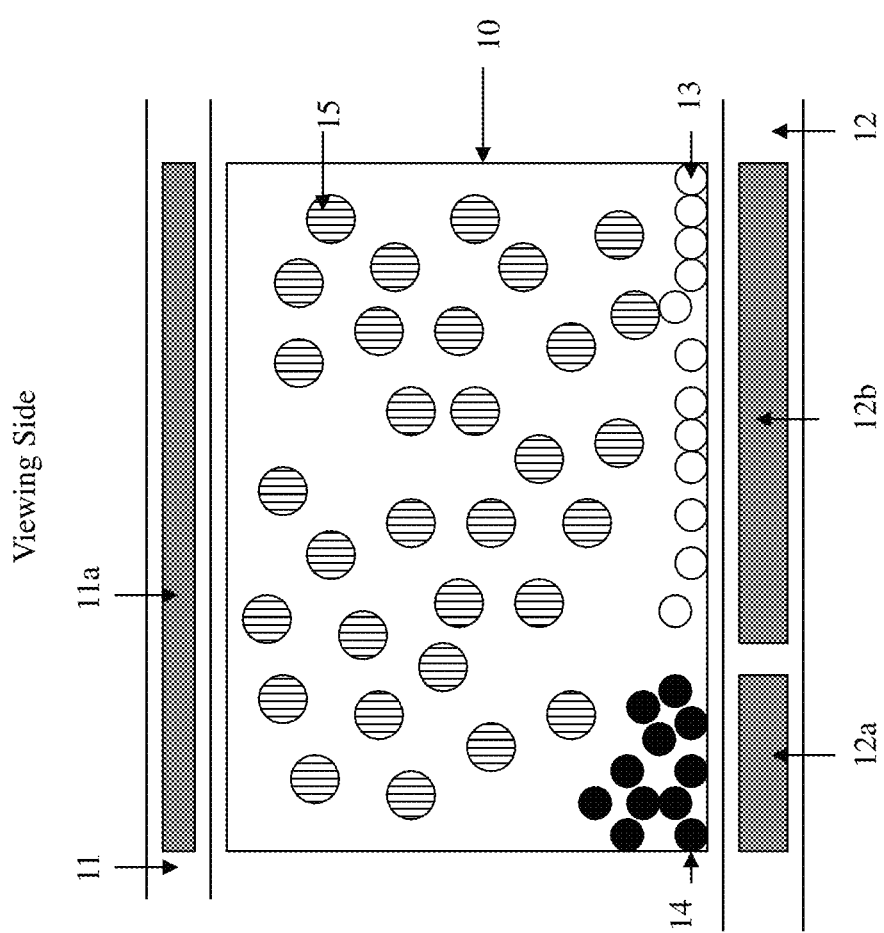

The present invention is directed to an electrophoretic fluid comprising non-charged (for example, magnitude of 0-10 mV) or slightly charged (for example, magnitude of 0.01-20 mV) color particles and at least one type of charged pigment particles (for example, magnitude of 20-200 mV) dispersed in a solvent or solvent mixture.

The electrophoretic fluid comprises at least two types of particles dispersed in a dielectric solvent or solvent mixture.

In the first aspect of the present invention, the display fluid comprises three types of particles, white charged pigment particles, black charged pigment particles and non-charged or slightly charged color particles, dispersed in a dielectric solvent or solvent mixture.

The white charged pigment particles may be any types of white pigment particles, including inorganic, organic or polymeric white particles. To achieve a high light scattering, pigments of a high refractive index are particularly useful. Suitable white pigment particles may include $TiO_2$, $BaSO_4$ and $ZnO$, with $TiO_2$ being the most preferred. The white pigment particles may be positively charged or negatively charged.

The black charged pigment particles may be inorganic, organic or polymeric black particles. Examples may include manganese ferrite black spinel, copper chromite black spinel, carbon black, zinc sulfide, stained black polymer particles or particles formed from other color absorbing materials. The black pigment particles and the white pigment particles are oppositely charged.

The charged pigment particles may also be encapsulated pigment particles or polymer coated pigment particles.

The two types of charged pigment particles may exhibit a native charge, or may be charged explicitly using a charge control agent, or may acquire a charge when suspended in a solvent or solvent mixture.

Suitable charge control agents are well known in the art; they may be polymeric or non-polymeric in nature or may be ionic or non-ionic.

The ionic surfactants may include (a) the anionic type: alkane carboxylic salts, alkane sulfonic salts, such as Aerosol OT, alkyl-aromatic sulfonic salts, such as sodium dodecylbenzenesulfonate, isopropylamine, alkyl benzene sulfonate, phosphates, phosphoric salts or the like, and (b) the cationic type: fatty amine salts, quaternary ammonium salts, alkyl pyridium salts or the like.

The non-ionic surfactants may include sorbitan monoesters, polyethoxylated nonionics, polybutene succinimide, maleic anhydride copolymers, vinylpyridine copolymers, vinylpyrrolidone copolymer (such as Ganex™ from International Specialty Products), (meth)acrylic acid copolymers, N,N-dimethylaminoethyl (meth)acrylate copolymers and the like.

Fluorosurfactants are particularly useful as charge controlling agents in a fluorocarbon solvent. These include FC fluorosurfactants such as FC-170C™ FC-171™, FC176™, FC430™, FC431™ and FC740™ from 3M Company and Zonyl™ fluorosurfactants such as Zonyl™ FSA, FSE, FSN, FSN-100, FSO, FSO-100, FSD and UR from Dupont.

The non-charged or slightly charged color particles may be non-white and non-black, e.g., red, green or blue particles.

The non-charged or slightly charged color particles are substantially transparent and the color transparency comes from the refractive index similarity between the color particles and the solvent in which the particles are dispersed. The difference between the refractive index of the non-charged or slightly charged color particles and that of the solvent or solvent mixture in which the particles are dispersed is preferably less than 5% of the higher value.

If the refractive index of the non-charged or slightly charged color particles is not matched to that of the solvent, the particles may scatter light in the display medium. In order to eliminate problems associated with the mismatch of the refractive indices, the size of the non-charged or slightly charged color particles is preferably in the nanometer range, more preferably, less than 100 nanometer. Materials for this type of non-charged or slightly charged color particles may include, but are not limited to, commercially available colorants used in the LCD industry for color filter applications, such as Clariant's Hostaperm Red D2B-COF VP 3781 (i.e., red 254) which is in the class of diketopyrrolopyrrole, Hostaperm Blue E3R-COF VP3573 (i.e., blue 15:6) which is in the class of phthalocyanine, or Hostaperm Violet RL-COF O2 VP3101 (i.e., violet 23) which is in the class of dioxazine.

In another embodiment, the non-charged or slightly charged color particles may have a transparent polymeric matrix and with dye molecules solubilized in the matrix. Since it is easier to have the refractive indices of a polymer matrix and the surrounding fluid medium matched (difference <5% of the higher value), the size of the particles does not need to be tightly controlled. Examples of this type of non-charged or slightly charged color particles may include, but are not limited to, dyed polymeric microparticles supplied by Merck Chemicals Ltd.; dyed polystyrene particles supplied by Spherotech Inc. or the like. For the color particles with a transparent polymeric matrix, the dye soluble therein is much more dilute and adjustable. For example, the concentration of the red dye in the red particles may be adjusted to allow the light in the blue and green regions to be absorbed and the light in the red region to pass through. With a white background to reflect the red color, the red color brightness can be maximized.

The color particles are non-charged or slightly charged. However, if they carry a slight charge, the charge polarity is preferably the same as that of the charged white pigment particles. As a result, the slight charge of the color particles may move the color particles away from the black particles, which results in better color saturation.

Alternatively, the non-charged or slightly charged particles may carry a slight charge the polarity of which is the same as that of the charged black pigment particles.

In one embodiment, the zeta potential of the charged particles is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to between 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential.

The three types of particles are dispersed in a solvent or solvent mixture to form a display fluid.

The solvent or solvent mixture in which the particles are dispersed preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicone oil, such as DC200 from Dow Corning, aromatic hydrocarbons such as toluene, xylene, phenylxylylethane, dodecylbenzene or alkylnaphthalene; halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del. The solvent or solvent mixture is preferably clear and colorless.

Figure 1C:
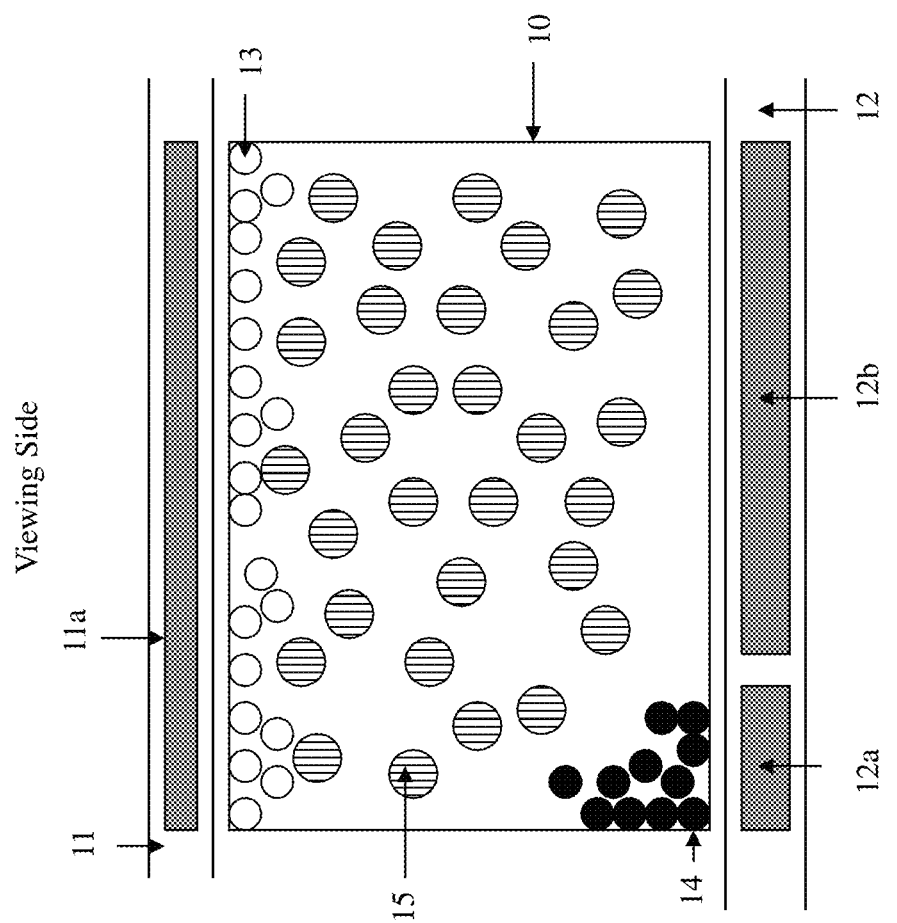

FIGS. 1a-1c depict how three different color states may be displayed with a display fluid comprising three types of particles as described above.

As shown in FIG. 1a, an electrophoretic fluid (10) is sandwiched between a first layer (11) comprising a common electrode (11a) and a second layer (12) comprising pixel electrodes (12a and 12b). The fluid comprises three types of particles, white charged pigment particles (13), black charged pigment particles (14) and non-charged or slightly charged color particles (15), dispersed in a clear and colorless solvent. In this example, the color particles (15) are of the red color.

The white and black pigment particles are oppositely charged. For example, if the black pigment particles are positively charged, then the white pigment particles are negatively charged. Accordingly, the two types of charged pigment particles (13 and 14) may move towards the common electrode (11a) or the pixel electrodes (12a or 12b), depending on the charge polarity of the particles and the voltage potential difference applied between the common electrode and the pixel electrodes.

In this example, the common electrode is on the viewing side.

It is also noted that there may be more than two pixel electrodes associated with a pixel.

The color particles (15), as stated above, are particles which are non-charged or slightly charged, and therefore, they remain almost stationary during operation of the display device and are substantially uniformly dispersed throughout the electrophoretic fluid.

In FIG. 1a, when proper voltages are applied to the common electrode (11a) and the two pixel electrodes (12a and 12b), the charged black particles (14) would move to be near or at the common electrode (11a) and the oppositely charged white pigment particles (13) would move to be near or at one of the pixel electrodes (e.g., 12b), causing the black color to be seen at the viewing side.

It is also possible for the voltages to be set to cause the white charged pigment particles to move to be at or near both pixel electrodes (12a and 12b), to display the black color.

In FIG. 1b, when proper voltages are applied to the common electrode (11a) and the two pixel electrodes (12a and 12b), the charged black particles (14) would move to be near or at one of the pixel electrodes (e.g., 12a) and the oppositely charged white pigment particles (13) would move to be near or at the other pixel electrode (12b), causing the red color (i.e., the color of the color particles (15)) to be seen at the viewing side. In this scenario, the color particles (15) act as a red color filter for the light reflected by the white particles, achieving the red color.

In one embodiment as shown, the black charged pigment particles (i.e., the darker of the two types of charged pigment particles) move to be near or at the smaller of the two pixel electrodes in order to achieve better brightness of the red color. However it is also possible to have the two pixel electrodes of the same size.

In FIG. 1c, when proper voltages are applied to the common electrode (11a) and the two pixel electrodes (12a and 12b), the charged white pigment particles (13) would move to be near or at the common electrode (11a) and the oppositely charged black particles would move to be near or at one of the pixel electrodes (e.g., 12a), causing the white color to be seen at the viewing side. It is also possible for the voltages to be set to cause the charged black particles to move to be at or near both pixel electrodes (12a and 12b), when the white color is being displayed.

Figure 2A:
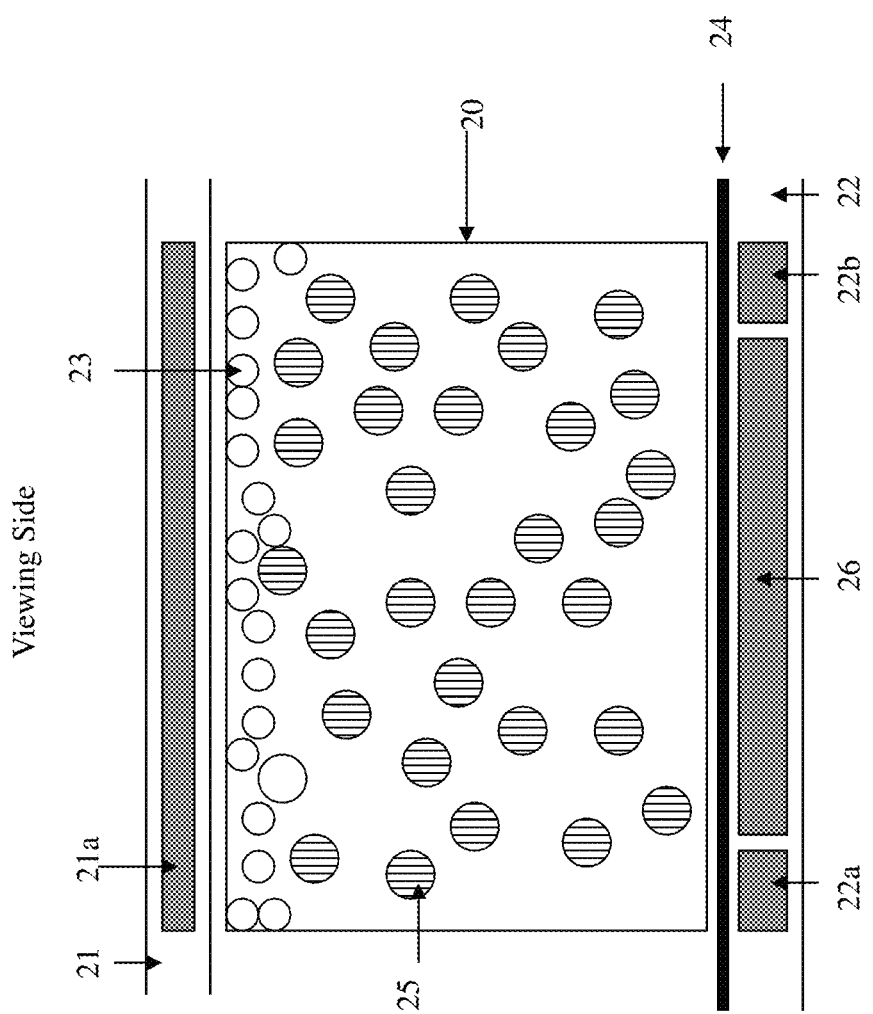
FIGS. 2a-2c illustrate an alternative design.
Figure 2B:
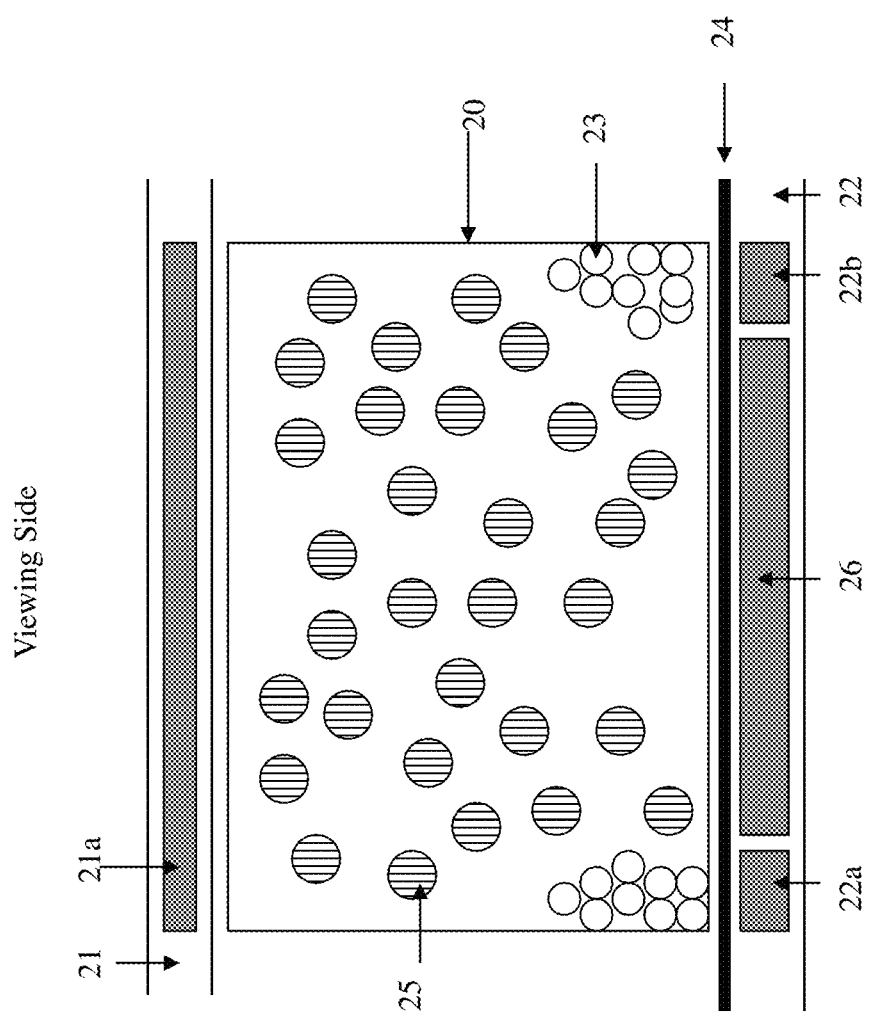
Figure 2C:
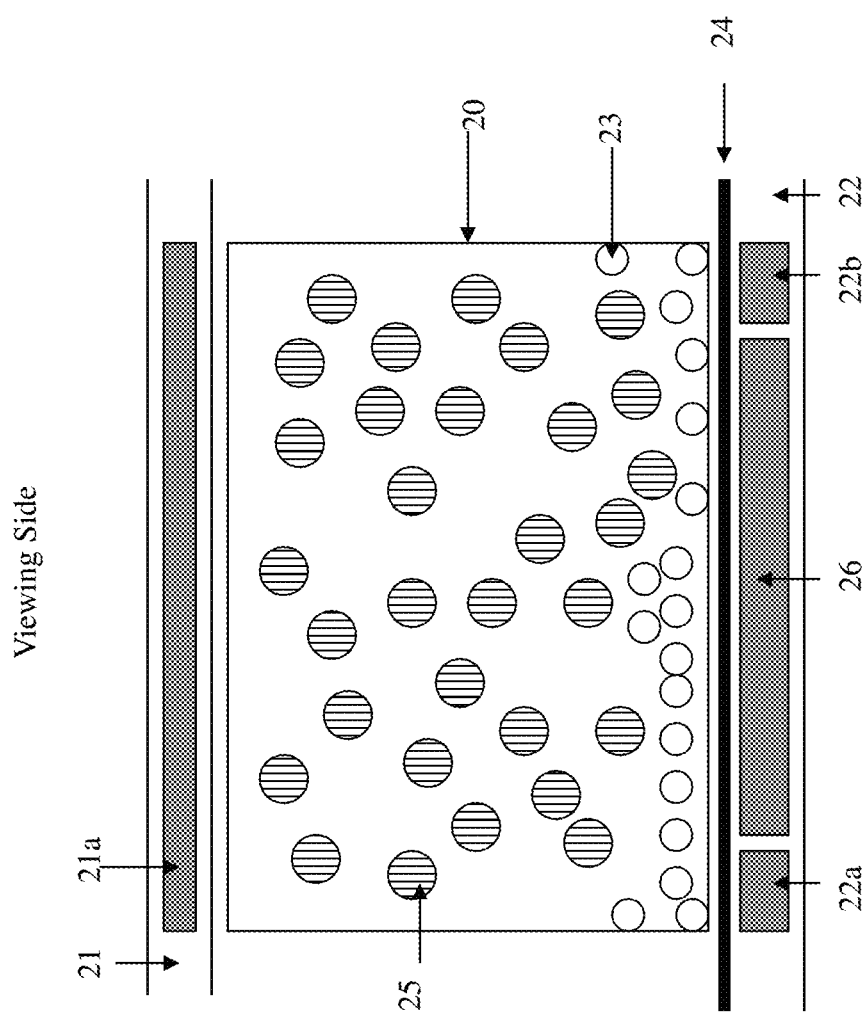

FIGS. 2a-2c illustrate an alternative design of the present invention. As shown in FIG. 2a, an electrophoretic fluid (20) is sandwiched between a first layer (21) comprising a common electrode (21a) and a second layer (22) comprising one pixel electrode (26) and two in-plane electrodes (22a and 22b). The pixel electrode (26) is between the two in-plane electrodes (22a and 22b) and there is a gap between the electrodes.

In practice, it is also possible to have only one in-plane electrode next to the pixel electrode.

In this design, there is a background layer (24) (e.g., black) which may be above or beneath the second layer (22) or the second layer may serve as the background layer.

The electrophoretic fluid comprises two types of particles, white charged pigment particles (23) and non-charged or slightly charged color particles (25), dispersed in a clear and colorless solvent. In this example, the color particles (25) are of the red color.

Other features (e.g., charge controlling agents, solvents, material choices, etc.) described above for the three particle system are also applicable to this design.

The white pigment particles may be positively or negatively charged. In this example, the common electrode is on the viewing side.

In FIG. 2a, when proper voltages are applied to the common electrode (21a) and the pixel and in-plane electrodes (26, 22a and 22b), the charged white pigment particles (23) would move to be near or at the common electrode (21a), causing the white color to be seen at the viewing side.

In FIG. 2b, when proper voltages are applied to the common electrode (21a) and the pixel and in-plane electrodes (26, 22a and 22b), the charged white particles (23) would move to be near or at the in-plane electrodes (22a and 22b), causing the color of the background layer (i.e., black) to be seen at the viewing side. In this scenario, the red color of the color particles (25) is absorbed by the black background color.

In FIG. 2c, when proper voltages are applied to the common electrode (21a) and the pixel and in-plane electrodes (26, 22a and 22b), the white pigment particles (23) would move to be near or at the pixel and in-plane electrodes, causing the red color to be seen at the viewing side. In this scenario, the red particles (25) act as a red color filter for the light reflected by the white particles, achieving the red color.

While in the examples of FIGS. 1 and 2, the color particles are of the red color, in practice, they may be of the green, blue or another color, as required by the display application.

The designs as shown in FIGS. 1 and 2 therefore are ideal for a color display device wherein each pixel consists of three sub pixels, one of which has red particles as shown in FIGS. 1 and 2, another of which has green particles, and a third of which has blue particles.

FIG. 3 illustrates how multiple colors are displayed with a display device comprising the display fluid of the present invention. Each rectangle represents a sub-pixel and each pixel has three sub-pixels. Three electrophoretic fluids as described above are used.

Figure 3C:
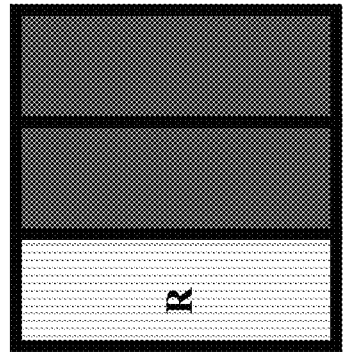
FIGS. 3a-3e illustrate the color display application of the present invention.
Figure 3E:
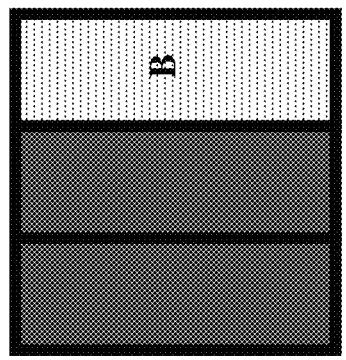
Figure 3B:
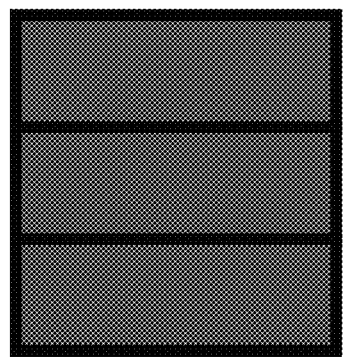
Figure 3D:
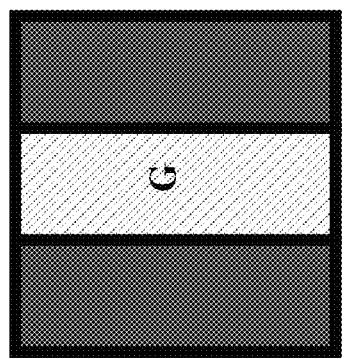
Figure 3A:
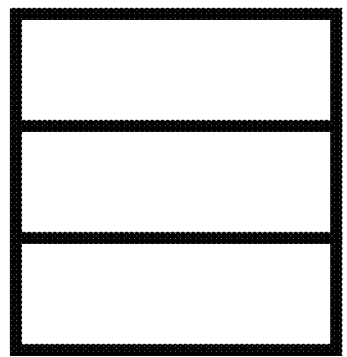

In FIG. 3a, when a white pixel is desired, all three sub-pixels are turned to the white color state. In FIG. 3b, when a black pixel is desired, all three sub-pixels are turned to the black state. FIG. 3c, when a red color is desired, one of the sub-pixel is turned to red (as shown in FIG. 1b or 2c) and the remaining two sub-pixels are turned to the black state for maximum color saturation. Similarly, FIG. 3d and FIG. 3e display the green and blue colors respectively. Alternatively, in FIGS. 3c, 3d and 3e, one of the sub-pixel is driven to the color state while the remaining two sub-pixels are driven to the white state for maximum brightness (at the expense of the color saturation). Further alternatively, in FIGS. 3c, 3d and 3e, one of the sub-pixel is driven to the color state while the remaining two sub-pixels are driven to the black and white states respectively. Such a full color display can have the same black and white characters of a good black and white display, but also show red, green and blue colors of high quality.

Each sub-pixel may be a display cell and each pixel consists of three sub-pixels. The three display cells, each representing a sub-pixel, are filled with display fluids comprising red, green and blue non-charged or slightly charged particles, respectively.

However, it is also within the scope of the present invention that all display cells are filled with a display fluid having the non-charged or slightly charged particles of the same color. In this case, the resulting display device would have a monochrome option for images.

The term "display cell" referred to in the present application may be of a conventional walled or partition type, a microencapsulated type or a cup-like microcell type. In the microcell type, the electrophoretic display cells may be sealed with a top sealing layer. There may also be an adhesive layer between the electrophoretic display cells and the common electrode. The term "display cell" is intended to refer to a micro-container which is individually filled with a display fluid. Examples of "display cell" include, but are not limited to, microcells, microcapsules, micro-channels, other partition-typed display cells and equivalents thereof.

While particular forms of the invention have been illustrated and described, it will be apparent that various modifications can be made without departing from the spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An electrophoretic display comprising:
   an electrophoretic display fluid which comprises transparent color particles, a first type of charged pigment particles, and a second type of charged pigment particles, all of which are dispersed in a solvent or solvent mixture, wherein the first and the second types of charged pigment particles are oppositely charged and one type has a color darker than the other type, and the transparent color particles comprise a transparent polymeric matrix with dye molecules solubilized therein; and
   a first layer on a viewing side and a second layer, and the electrophoretic display fluid is sandwiched between the first and the second layers;
   wherein,
   (a) the color of the first type of charged pigment particles is displayed when the first type of charged pigment particles is at or near the first layer,
   (b) the color of the second type of charged pigment particles is displayed when the second type of charged pigment particles is at or near the first layer, and
   (c) the color of the transparent color particles is displayed when the charged pigment particles are at or near the second layer.

2. The display of claim 1, wherein the refractive index of the transparent color particles matches that of the solvent or solvent mixture.

3. The display of claim 1, wherein the transparent color particles are non-white and non-black.

4. The display of claim 1, wherein the transparent color particles are non-charged particles.

5. The display of claim 1, wherein the solvent or solvent mixture is clear and colorless.

6. The display of claim 1, wherein the second layer comprises at least two pixel electrodes that include a first pixel electrode having a smaller area than a second electrode.

7. The display of claim 6, wherein the color of the transparent color particles is displayed when the darker-colored pigment particles are at or near the first pixel electrode and the lighter-colored charged pigment particles are at or near the second pixel electrode.

* * * * *